US 7,779,190 B2

(12) United States Patent
Mochida et al.

(10) Patent No.: US 7,779,190 B2
(45) Date of Patent: Aug. 17, 2010

(54) ARBITRATION DEVICE FOR ARBITRATING AMONG A PLURALITY OF MASTER DEVICES, ARBITRATION METHOD, AND VIDEO PROCESSING DEVICE INCLUDING THE ARBITRATION DEVICE

(75) Inventors: Tetsuji Mochida, Osaka (JP); Tokuzo Kiyohara, Osaka (JP); Takashi Yamada, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/559,916

(22) Filed: Sep. 15, 2009

(65) Prior Publication Data

US 2010/0005209 A1 Jan. 7, 2010

Related U.S. Application Data

(62) Division of application No. 11/629,164, filed on Dec. 22, 2006, now Pat. No. 7,725,633.

(51) Int. Cl.
*G06F 13/00* (2006.01)

(52) U.S. Cl. .................. 710/240; 711/151; 711/152; 710/35

(58) Field of Classification Search .......... 710/35, 710/107, 113, 116, 117, 240, 241; 711/151, 711/152
See application file for complete search history.

(56) References Cited

U.S. PATENT DOCUMENTS

| 6,035,360 | A  | 3/2000  | Doidge et al.  |
|-----------|----|---------|----------------|
| 6,330,647 | B1 | 12/2001 | Jeddeloh et al. |
| 6,606,691 | B2 | 8/2003  | Didier et al.  |
| 6,735,653 | B2 | 5/2004  | Mathuna et al. |
| 7,054,968 | B2 | 5/2006  | Shrader et al. |
| 7,213,084 | B2 | 5/2007  | Ogilvie et al. |
| 2002/0002646 | A1 | 1/2002 | Jeddeloh |
| 2002/0003574 | A1 | 1/2002 | Kawamura |
| 2004/0019749 | A1 | 1/2004 | Mochida et al. |
| 2004/0054857 | A1 | 3/2004 | Nowshadi |
| 2005/0080967 | A1 | 4/2005 | Ries et al. |

FOREIGN PATENT DOCUMENTS

| CA | 1 430 144    | 7/2003 |
|----|--------------|--------|
| JP | 2000-207354  | 7/2000 |

(Continued)

OTHER PUBLICATIONS

Notice of Allowance mailed Jun. 16, 2009 in U.S. Appl. No. 11/629,164, filed Dec. 22, 2006.

(Continued)

*Primary Examiner*—Glenn A Auve
(74) *Attorney, Agent, or Firm*—Wenderoth, Lind & Ponack, L.L.P.

(57) ABSTRACT

An arbitration device arbitrates among master devices such that each master device is allowed to access a shared memory at a predetermined bandwidth, and the arbitration device permits an access request in a first period that a designer has set as desired if the access request has been made by a specific master device beyond a bandwidth that has been allocated in advance. The arbitration device masks an access request from the specific master device in a second period that follows the first period.

4 Claims, 11 Drawing Sheets

FOREIGN PATENT DOCUMENTS

| | | |
|---|---|---|
| JP | 2002-024166 | 1/2002 |
| JP | 2002-304368 | 10/2002 |
| JP | 2004-005589 | 1/2004 |
| JP | 2007-519058 | 7/2007 |
| WO | WO 2005/003961 A2 * | 1/2005 |

OTHER PUBLICATIONS

Office Action mailed Sep. 11, 2008 in U.S. Appl. No. 11/629,164, filed Dec. 22, 2006.

* cited by examiner

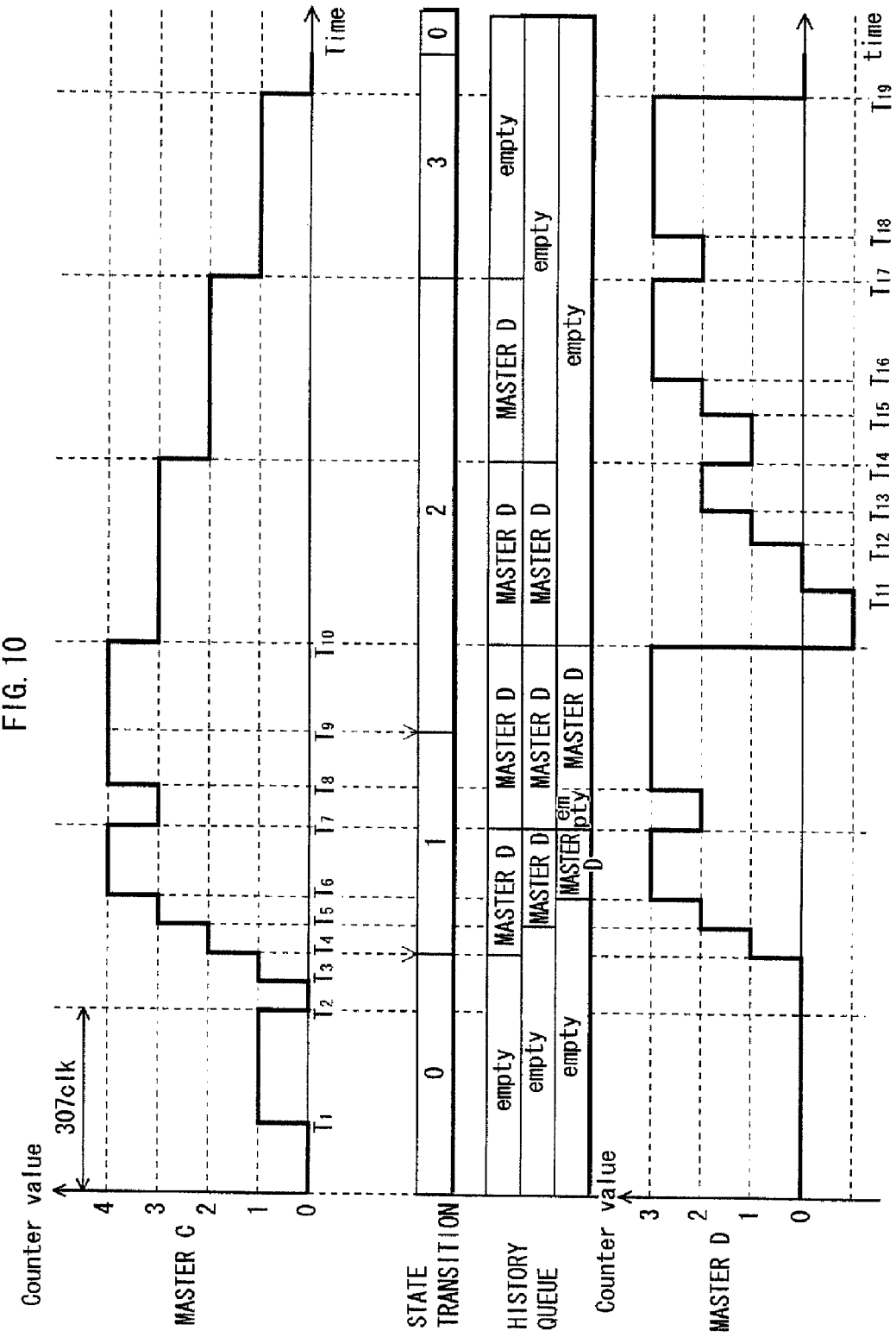

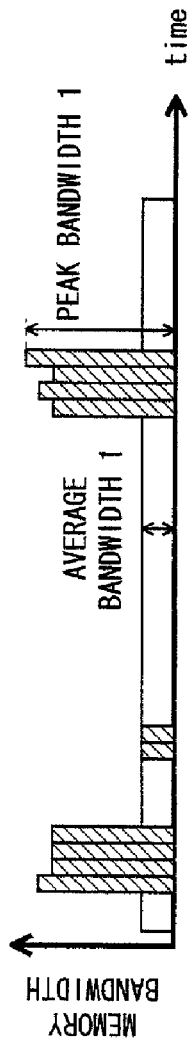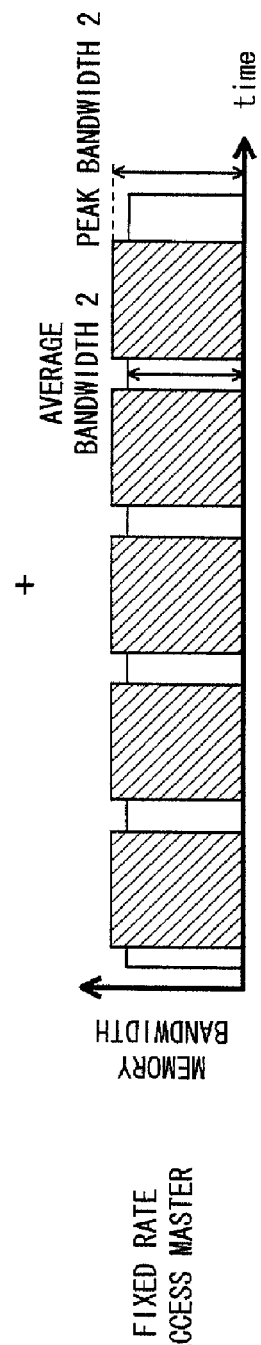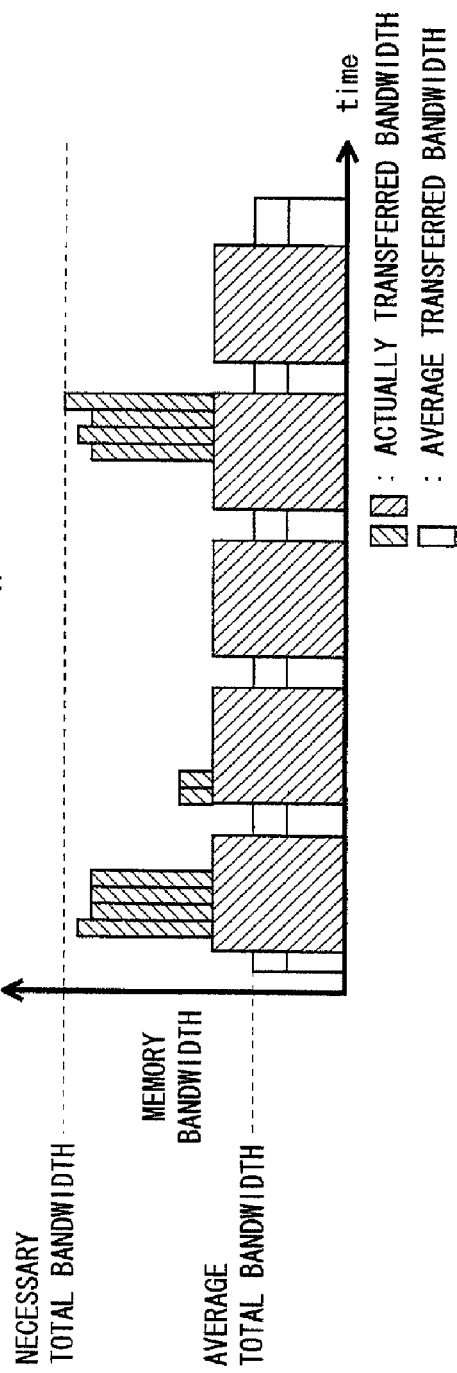
FIG. 11A  BURST ACCESS MASTER
FIG. 11B  FIXED RATE ACCESS MASTER
FIG. 11C

ARBITRATION DEVICE FOR ARBITRATING AMONG A PLURALITY OF MASTER DEVICES, ARBITRATION METHOD, AND VIDEO PROCESSING DEVICE INCLUDING THE ARBITRATION DEVICE

CROSS-REFERENCE TO RELATED APPLICATION

This application is a divisional of Ser. No. 11/629,164, filed Dec. 22, 2006 now U.S. Pat. No. 7,725,633.

BACKGROUND OF THE INVENTION

1. Field of the Invention

The present invention belongs to the technical field of bandwidth allocation technology.

2. Description of the Related Art

Bandwidth allocation technology is technology that, when a memory resource is shared by a plurality of master devices, guarantees memory access at a particular bandwidth for the plurality of master devices. The bandwidth allocation can be realized with arbitration control performed by an arbitration device. Following is a description of bandwidth allocation with a conventional arbitration device. With conventional bandwidth allocation, bandwidth control is realized by providing counters for bandwidth control in an arbitration device that attempts to arbitrate among a plurality of master devices. These counters are provided corresponding to each of the plurality of master devices, and if the arbitration device permits memory access by a particular master device, the count value for that master device is incremented. Two parameters, an upper limit value and a cycle number, are provided in this counter, and if the count value of the counter is less than the upper limit value, the arbitration device permits the access request from the master device. Conversely, if the count value is more than the upper limit value, the access request from the master device is not permitted. On the other hand, the cycle number prescribes a period after which the count value of the counter is automatically decremented. After the count value of the counter has reached the upper limit value, and until the period indicated by the cycle number elapses, the count value of the counter maintains the upper limit value, causing the access request of the master device to not be permitted. If the period indicated by the cycle number has elapsed and the count value of the counter has become less than the upper limit value, an access request from the master device is again permitted. Here, when the operating frequency of the memory is f [Hz], it is possible to operate the master device at a bandwidth prescribed in advance if an upper limit value $U$ and a count value $C$ are set so as to satisfy the expression below.

Bandwidth allocated to master device=operating frequency $f \times$counter upper limit value $U$/cycle number $C$ The conventional technology includes the technology described in Patent Document 1 and Patent Document 2.

Patent Document 1: Japanese Patent Application Publication No. 2004-5589

Patent Document 2: Japanese Patent Application Publication No. 2002-304368

BRIEF DISCLOSURE OF THE INVENTION

The required bandwidths of the plurality of master devices to be arbitrated often differ from one another. Typical of these master devices are burst access masters and fixed rate access masters.

A burst access master is a master device that does not constantly require bandwidth, but requires bandwidth locally during a particular period in a burst-like manner. Corresponding to such a master device is a cache controller that collectively reads the data in a CPU cache.

FIG. 11A shows the transition over time of bandwidth requested by a burst access master. The horizontal axis is a time axis, and the vertical axis indicates the bandwidth required by the master device. As shown in FIG. 11A, the bandwidth required by the burst access master is concentrated in particular short periods on the time axis, and in other periods bandwidth is not required. That is, requesting high bandwidth in a narrow range on the time axis is a distinctive characteristic of a burst access master.

A fixed rate access master is a master device that constantly requests bandwidth of a particular height. One such fixed rate access master is a DMA controller that supplies data to a decoder, which decodes an AV signal. Here, an AV signal is constituted by a plurality of a pair of a display period and a blanking period. The fixed rate access master requests memory access during the display period, and does not request memory access during the blanking period. Therefore the fixed rate access master constantly requires a particular fixed bandwidth, except during a blanking period in the interval between display periods. FIG. 11B shows transitions of the bandwidth required by the fixed rate access master. As shown in FIG. 11B, the bandwidth requested by the fixed rate access master has a fixed height, but becomes low in a blanking period. That is, it is clear that the necessary bandwidth repeats long "high" in a display period→short "low" in a blanking period→long "high" in a display period→short "low" in a blanking period.

A fixed rate access master nearly constantly requires bandwidth of a particular height, but a burst access master requests a high bandwidth in a particular localized period, and so when attempting to implement a fixed rate access master and a burst access master in the same system, as shown in FIG. 11C, it is necessary to guarantee, for the system as a whole, bandwidth of a height obtained by adding together the bandwidth required by the fixed rate access master and the bandwidth required by the burst access master. The total value of bandwidth as shown in FIG. 1C, if requested by the system as a whole, leads to necessarily increasing the operating frequency or the bit rate, thus necessarily increasing the hardware cost.

It is an object of the present invention to provide an arbitration device that can guarantee the bandwidth required by a burst access master and a fixed rate access master, without increasing the operating frequency of the system as a whole.

In order to solve the above problems, the present invention provides an arbitration device that arbitrates among master devices, such that each master device is allowed to access a shared memory at a predetermined bandwidth, comprising: permitting a received access request in a first period that a designer has set as desired, if the access request has been made by a specific master device beyond a bandwidth that has been allocated in advance; and masking an access request from the specific master device in a second period that follows the first period.

In the present invention, with the above configuration, when a burst access master has requested memory access as a specific master device, the arbitration device approves that request in a first period. Thus, the bandwidth required by the burst master is guaranteed. If the arbitration device permits memory access from the burst access master, access from the fixed rate access master is not possible in the first period, and a delay in processing occurs. Instead, in a second period following from the first period, the arbitration device masks an access request from the burst access master. In the second period, it is possible for the fixed rate access master to have exclusive access, so that it can recover from the delay in processing by, for example, performing processing during the blanking period. Thus, it is possible for the fixed rate access master to recover from the delay produced by giving an access right to the burst access master. Although access beyond the allocated bandwidth is approved, access by the burst access master is masked, and so the frequency of access in total does not change between the fixed rate access master and the burst access master. The total bandwidth required can be set to not more than a particular fixed value, and so in the present invention, it is possible to allow the fixed rate access master and the burst access master to coexist well within the same system.

BRIEF DESCRIPTION OF THE DRAWINGS

FIG. 10 is a diagram in which the transitions of a master C counter and a master D counter are expressed in a time series.

FIGS. 11A-11C are explanatory diagrams for describing calculation of the total bandwidth required in a conventional system.

DETAILED DESCRIPTION OF THE INVENTION

Following is a description of embodiments of the present invention with reference to the accompanying drawings.

First Embodiment

<Configuration>

Figure 1:
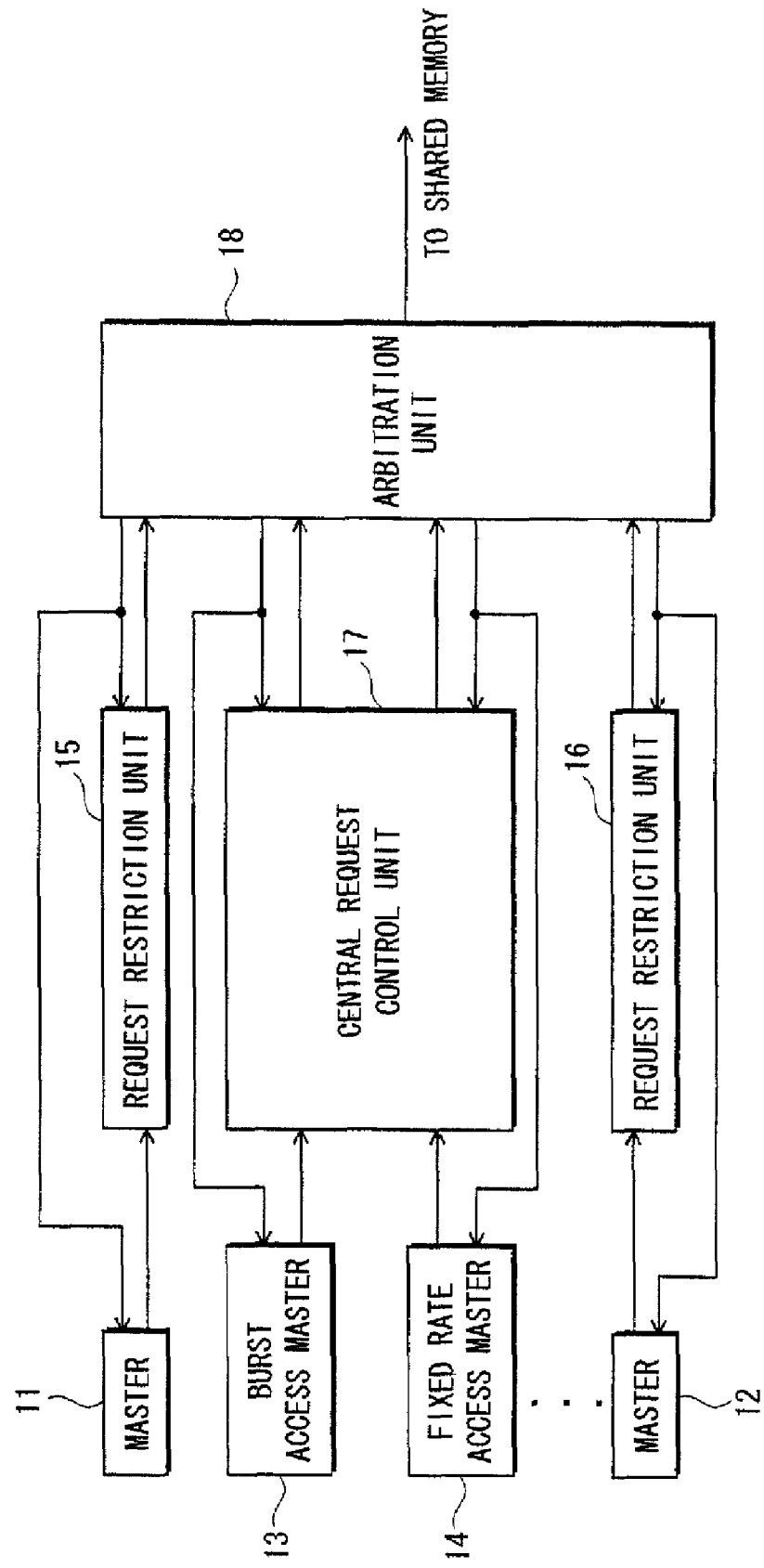
FIG. 1 is a functional block diagram of an access arbitration unit in a first embodiment of the present invention.

FIG. 1 is a functional block diagram of an access arbitration unit in a first embodiment of the present invention. Here, a master 11, a master 12, a burst access master 13, and a fixed rate access master 14 are control units that each access a shared memory.

The burst access master 13 is a control unit such as a CPU that sometimes accesses the shared memory in a burst-like manner, and sometimes does not access the shared memory at all for some duration. Generally it is difficult or impossible to forecast the frequency with which access will occur, so it is difficult to issue a request in advance or to implement pipeline execution.

The fixed rate access master 14 is a control unit whose accesses need to be guaranteed to a certain degree during an access guarantee period. Here, an access guarantee period indicates, for example, a period that can be a specific processing cycle, such as a one macro block processing period, one macro block slice processing period, or one frame processing period in video encoding/decoding processing, a one frame processing period in audio encoding/decoding processing, or a one field display period or one line display period in video output.

As shown in FIG. 1, the master 11 is connected to an arbitration unit 18 via a request restriction unit 15. The master 11 issues an access request signal to the request restriction unit 15 as necessary.

The master 12 is connected to the arbitration unit 18 via a request restriction unit 16. The master 12 issues an access request signal to the request restriction unit 16 as necessary.

The burst access master 13 and the fixed rate access master 14 are connected to the arbitration unit 18 via a central request restriction unit 17. The burst access master 13 and the fixed rate access master 14 issue an access request signal to the central request restriction unit 17 as necessary.

The request restriction unit 15, the request restriction unit 16, and the central request restriction unit 17, based on the past access history and a permitted access frequency that has been set in advance, judge whether to output a received access request signal as-is, or after the received access request signal has been masked. Then, according to the results of that judgment, the access request signal or the access request signal after mask processing is output to the arbitration unit 18.

The arbitration unit 18 arbitrates the access request signals or access request signals after mask processing that have been issued from the request restriction unit 15, the request restriction unit 16, and the central request restriction unit 17 according to a fixed order of priority that has been set in advance. At the same time that the arbitration unit 18 issues access permission signals to each of the master 11, the master 12, the burst access master 13, the fixed rate access master 14, the request restriction unit 15, the request restriction unit 16, and the central request restriction unit 17, the arbitration unit 18 issues an access request signal to the shared memory.

Figure 2:
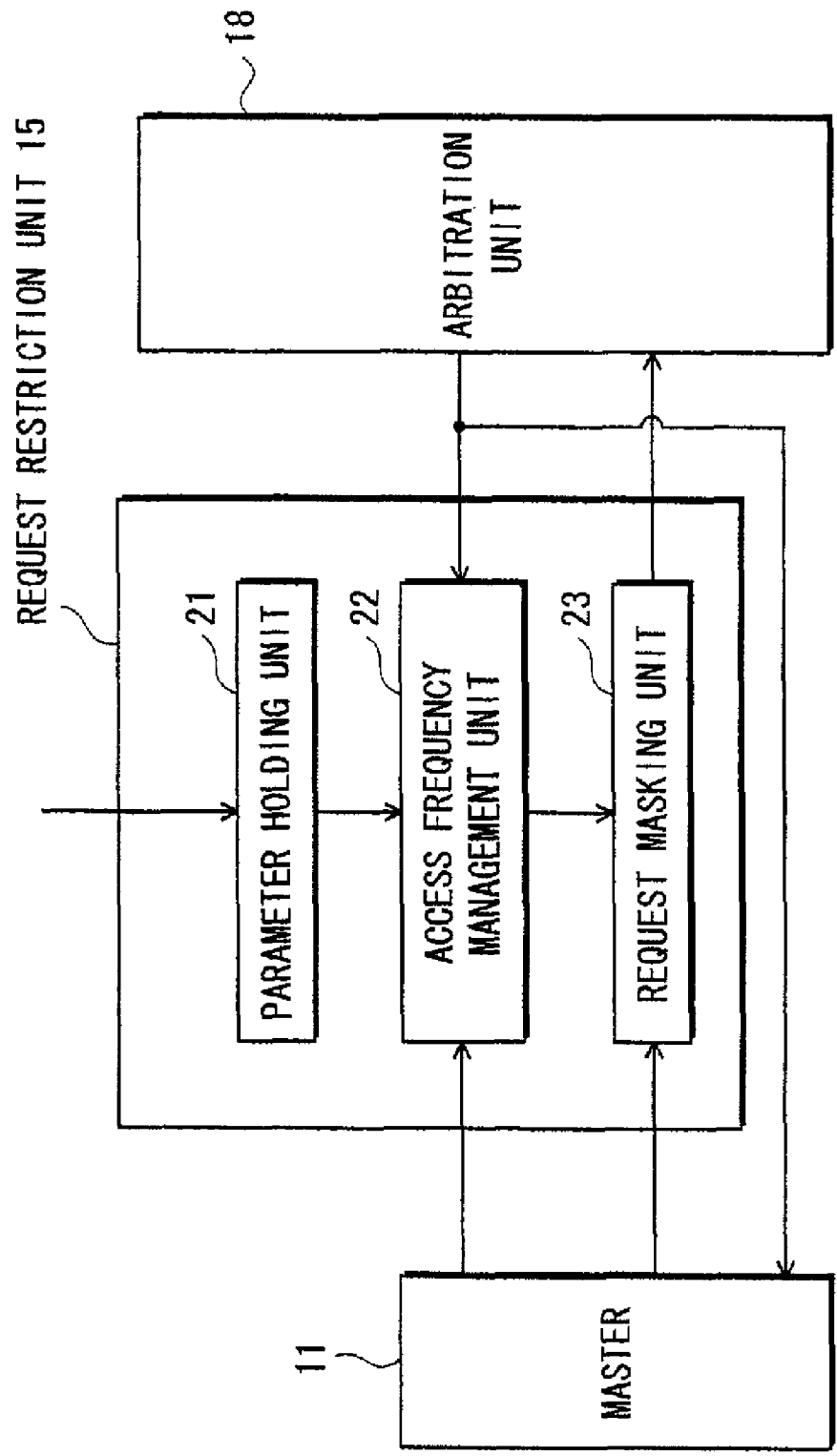
FIG. 2 is a block diagram of a request restriction unit 15.

Next is a detailed description of the request restriction unit 15. A detailed block diagram of the request restriction unit 15 is shown in FIG. 2. The request restriction unit 16 has the same configuration as the request restriction unit 15, and so here only the request restriction unit 15 is described.

The request restriction unit 15 includes a parameter holding unit 21, an access frequency management unit 22, and a request masking unit 23.

The parameter holding unit 21 receives and holds a control parameter signal that indicates the permitted access frequency of the master 11. The control parameter is set externally by a user.

Here, the control parameter that indicates the permitted access frequency includes (i) the cycle number of the master 11, and (ii) information of the access size or the number of accesses to be guaranteed in the period indicated by the cycle number.

The access frequency management unit 22 receives a control parameter signal from the parameter holding unit 21, transfer size information or the number of access instances from the master 11, and an access permission signal from the arbitration unit 18. When the access of the master 11 is more than the permitted access frequency, the access frequency management unit 22 issues a mask signal to the request masking unit 23.

Also, the access frequency management unit 22 may manage the access frequency using the number of instances of access, or using the access size. When the access frequency is managed using the number of instances of access, when for example the number of instances of access by the master 11 is one, an access counter is incremented by one when an access permission signal has been received from the arbitration unit 18. Management of the access frequency can be realized with a control that, each time the period indicated by the cycle number of the master 11 has elapsed, decrements the access counter by the number of accesses to be guaranteed in the period indicated by the cycle number. On the other hand, when the access frequency is managed using the access size, an access size counter is incremented by the size indicated by the transfer size information from the master 11 when an access permission signal has been received from the arbitration unit 18. Management of the access frequency can be realized with a control that, each time the period indicated by the cycle number of the master 11 has elapsed, decrements the access size counter by the size indicated by the information of the access size to be guaranteed in the period indicated by cycle number.

The request masking unit 23 receives an access request signal from the master 11. Also, the request masking unit 23 receives a mask signal issued when access of the master 11 is more than the permitted access frequency. When the request masking unit 23 has received a mask signal from the access frequency management unit 22, the request masking unit 23 masks the access request signal from the master 11, and after mask processing issues the access request signal to the arbitration unit 18. When a mask signal has not been received, the request masking unit 23 issues the access request signal to the arbitration unit 18 without masking the access request signal.

Figure 3:
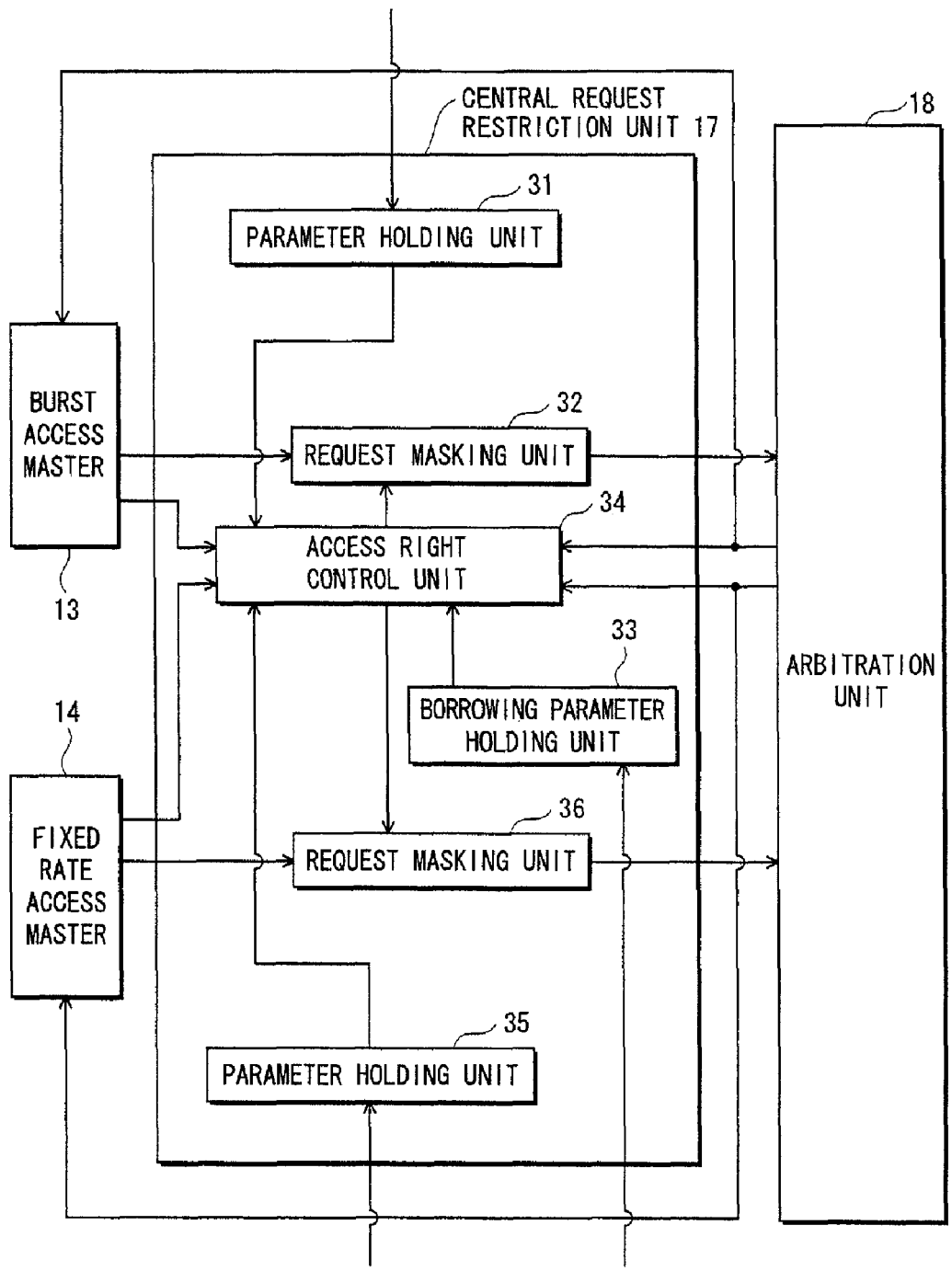
FIG. 3 is a block diagram of a central request restriction unit 17.

Next is a description of the details of the central request restriction unit 17. A detailed block diagram of the central request restriction unit 17 is shown in FIG. 3. The configuration of the central request restriction unit 17 is similar to the configuration of the request restriction unit 15, and so only the differences are described below.

The central request restriction unit 17 is connected to one burst access master 13 and one fixed rate access master 14, and receives from each an access request signal, and transfer size information or the number of access instances. The central request restriction unit 17 includes a borrowing parameter holding unit 33 and an access right control unit 34.

The borrowing parameter holding unit 33 receives and holds a borrowing parameter signal for borrowing and lending access rights among masters. The borrowing parameter is set externally by a user.

Here, a borrowing parameter signal for borrowing and lending access rights among masters includes information of a maximum period in which it is possible to borrow an access right (information of a level 1 period), information of a cycle time from borrowing once until it becomes possible to borrow again (a period from the start of level 1 to the end of a level 3), and the maximum number of borrow times that an access right can be borrowed. A maximum borrow size may be used instead of the maximum number of borrow times.

The access right control unit 34, when there is an access request from the burst access master 13, receives a borrowing parameter signal that is output from the borrowing parameter holding unit 33, a control parameter signal from a parameter holding unit 31, and transfer size information or the number of access instances from the burst access master 13. Likewise, when there is an access request from the fixed rate access master 14, the access right control unit 34 receives a borrowing parameter signal that is output from the borrowing parameter holding unit 33, a control parameter signal from a parameter holding unit 35, and transfer size information or the number of access instances from the fixed rate access master 14. Then, the access right control unit 34 outputs respective mask signals to a request masking unit 32 and a request masking unit 36 that receive the access request signals from the respective masters. Also, the access right control unit 34 receives an access permission signal from the arbitration unit 18.

In this way, mask signals obtained by the request masking unit 32 and the request masking unit 36 masking the access request signals from the respective masters are received from the access right control unit 34. This point differs from the request restriction unit 15.

Figure 4:
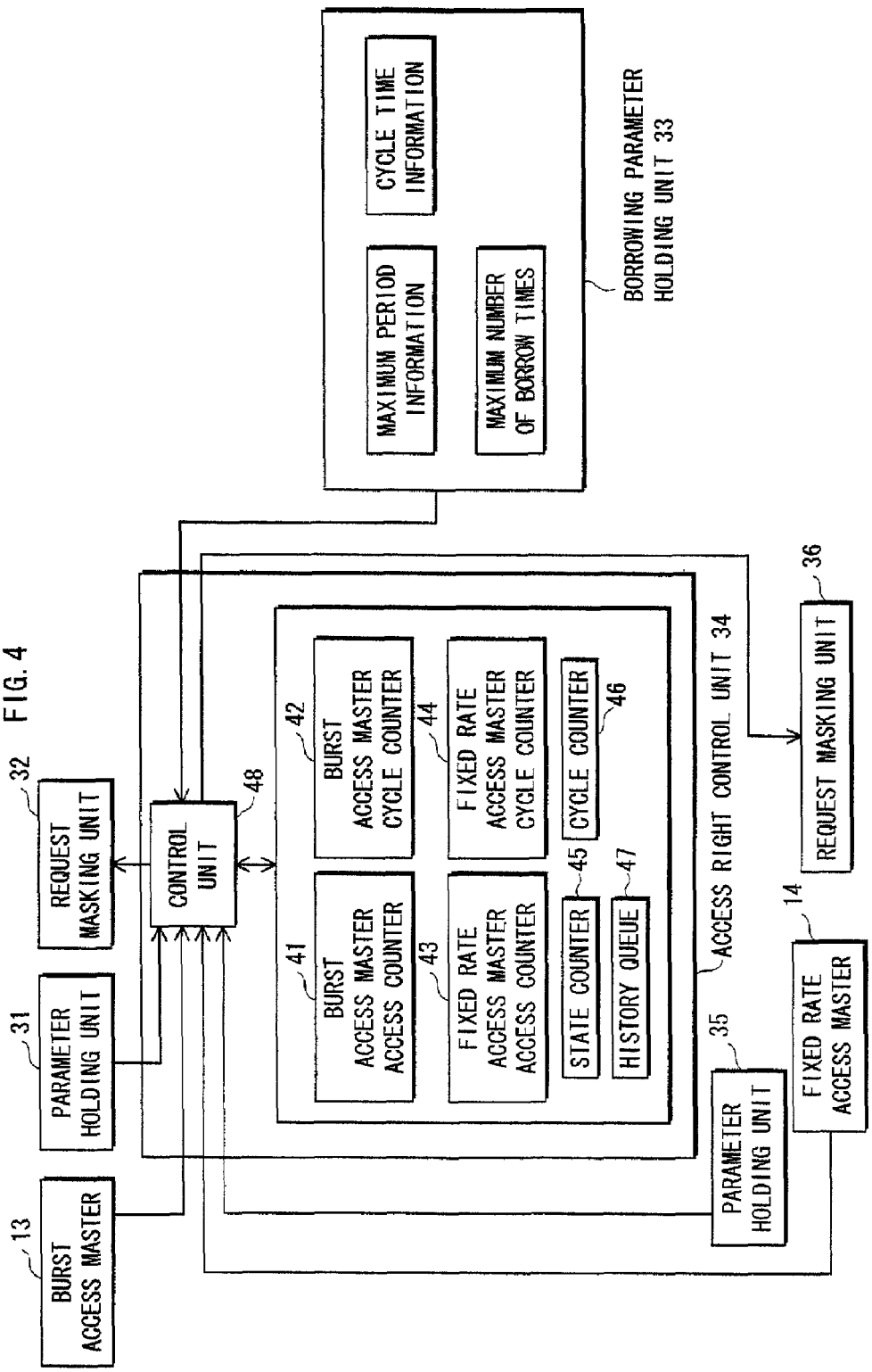
FIG. 4 is a detail diagram of an access right control unit 34 and a borrowing parameter holding unit 33.

Next is a description of the detailed configuration of the borrowing parameter holding unit 33 and the access right control unit 34 with reference to FIG. 4.

The borrowing parameter holding unit 33 holds information of the maximum period in which it is possible to borrow an access right, information of the cycle time from borrowing once until it becomes possible to borrow again, and the maximum number of borrow times that an access right can be borrowed.

The access right control unit 34 includes an access counter 41 and a cycle counter 42 for the burst access master 13, an access counter 43 and a cycle counter 44 for the fixed rate access master 14, a state counter 45, a cycle counter 46, a history queue 47, and a control unit 48.

The access counter 41 for the burst access master 13 is incremented when a command is received from the burst access master 13, and when a period indicated by the cycle number of the burst access master 13 elapses, the access counter 41 is decremented by the number of accesses to be guaranteed in the period indicated by the cycle number.

The access counter 43 for the fixed rate access master 14 is incremented when a command is received from the fixed rate access master 14, and when a period indicated by the cycle number of the fixed rate access master 14 elapses, the access counter 43 is decremented by the number of accesses to be guaranteed in the period indicated by the cycle number. The access counter 43 is also incremented when the burst access master 13 has borrowed the access right of the fixed rate access master 14, and in the case that there was a borrowing, the access counter 43 is decremented when a period indicated by the cycle number of the burst access master 13 elapses.

The cycle counter 42 for the burst access master 13 is an incrementer, and is a counter that measures the cycle number of the burst access master 13 held by the parameter holding unit 31.

The cycle counter 44 for the fixed rate access master 14 is an incrementer, and is a counter that measures the cycle number of the fixed rate access master 14 held by the parameter holding unit 35.

The state counter 45 is a counter that measures the level one period.

The period counter 46 is a counter that measures the period from borrowing once until it becomes possible to borrow again.

The history queue 47, when the burst access master 13 has used the bandwidth of the fixed rate access master 14, holds the ID of the fixed rate access master 14.

The control unit 48 compares and assesses the transfer size information or number of access instances from the burst access master 13, or the transfer size information or number of access instances from the fixed rate access master 14; the parameter signals output from the parameter holding unit 31 or the parameter holding unit 35; and the past access history; and outputs a High or Low mask signal according to the results thereof. In the level 1 state, the control unit 48 outputs a mask signal based also on the borrowing parameter signal output from the borrowing parameter holding unit 33.

<State Transition>

Figure 5:
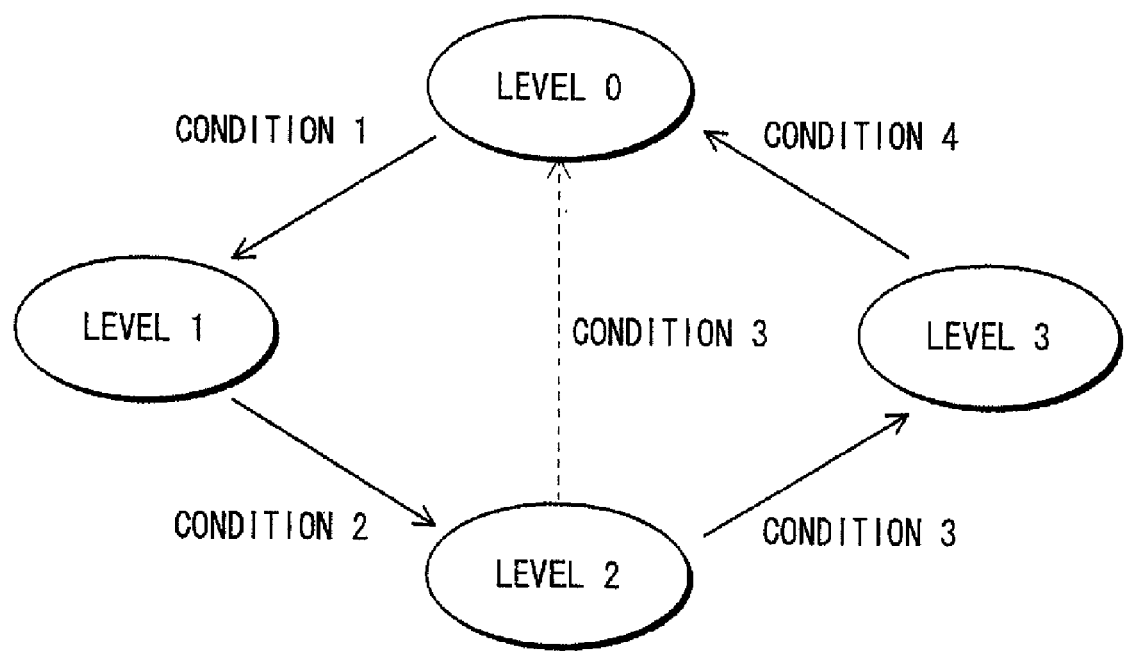
FIG. 5 shows state transitions.

Next is a description of transitions of the state of the access right control unit 34. In the present embodiment, the state transitions of the access right control unit 34 are as shown in FIG. 5. The meaning of each state is as described below.

Level 0 is a state in which there is no borrowing or lending of an access right, and the burst access master 13 and the fixed rate access master 14 are operating within an access frequency that has been set in advance.

Level 1 is a state in which the burst access master 13 has borrowed an access right from the fixed rate access master 14, so that the burst access master 13 accesses the memory at a rate that is more than the access frequency that has been set for it. On the other hand, the fixed rate access master 14 does not access the memory.

Level 2 is a state in which the access right borrowed by the burst access master 13 is being returned to the master from which it borrowed (the fixed rate access master 14). The burst access master 13 does not access the memory.

Level 3 is a state in which all of the access rights borrowed by the burst access master 13 have been returned, and the burst access master 13 cannot borrow an access right from the fixed rate access master 14.

Here, the period of level 1 can be set as desired by the designer. The period of level 2 can be obtained from the expression below.

Level 2 period={(number of accesses to be guaranteed in the period indicated by the cycle number of the burst access master 13+maximum number of times an access right can be borrowed)÷ number of accesses to be guaranteed in the period indicated by the cycle number of the burst access master 13}×
cycle number of the burst access master 13

When the number of accesses to be guaranteed is two or more, if there is a fraction present in the solution obtained by {(number of accesses to be guaranteed in the period indicated by the cycle number of the burst access master 13+maximum number of times an access right can be borrowed)÷number of accesses to be guaranteed in the period indicated by the cycle number of the burst access master 13}, then the fraction is rounded up.

Due to providing a level 2 period, even assuming that there was a level 1 period, the total average bandwidth in the access guarantee period is the same.

The peak bandwidth of the burst access master 13 can be obtained from the expression below.

Peak bandwidth=operating frequency $f$×(number of accesses to be guaranteed in the period indicated by the cycle number of the burst access master 13+maximum number of times an access right can be borrowed)/cycle number of the burst access master

13}

The designer may set the configuration such that adding together the intervals of level 1, level 2, and level 3 results in the access guarantee period.

Next is a description of transition conditions of each state shown in FIG. 5.

Condition 1 is that the burst access master 13 accesses the memory beyond an access frequency that has been set in advance.

Condition 2 is that the maximum period in which an access right can be borrowed after the burst access master 13 has borrowed an access right has elapsed.

Condition 3 is that all of the access rights borrowed by the burst access master 13 are returned.

Condition 4 is that the cycle time, from the time when the burst access master 13 borrows the access right until it becomes possible to borrow it again, has elapsed.

<Operation>

Figure 6:
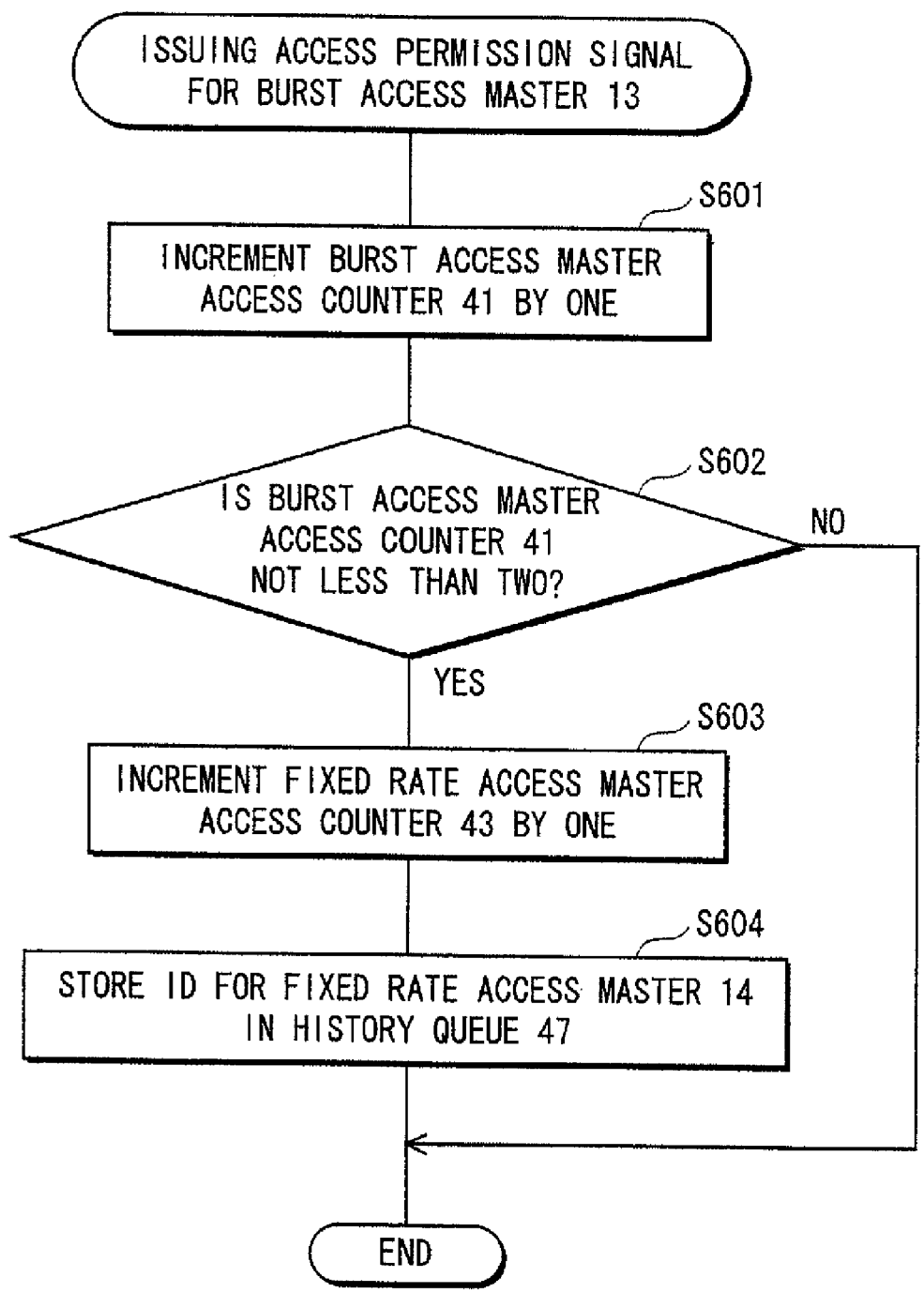
FIG. 6 is a flowchart that shows a counter control performed when an access permission signal for a burst access master 13 has been issued.

Next is a description of a counter control performed when the arbitration unit 18 has issued an access permission signal for the burst access master 13, with reference to the flowchart in FIG. 6.

When an access permission signal for the burst access master 13 is issued, the burst access master access counter 41 is incremented by one (Step S601). Next, the burst access master access counter 41 determines whether or not the count is two or more (Step S602). When the count is two or more, the fixed rate access master access counter 43 is incremented by one (Step S603), and an ID for the fixed rate access master 14 is stored in the history queue 47 (Step S604). When the count is less than two, processing is ended.

Figure 7:
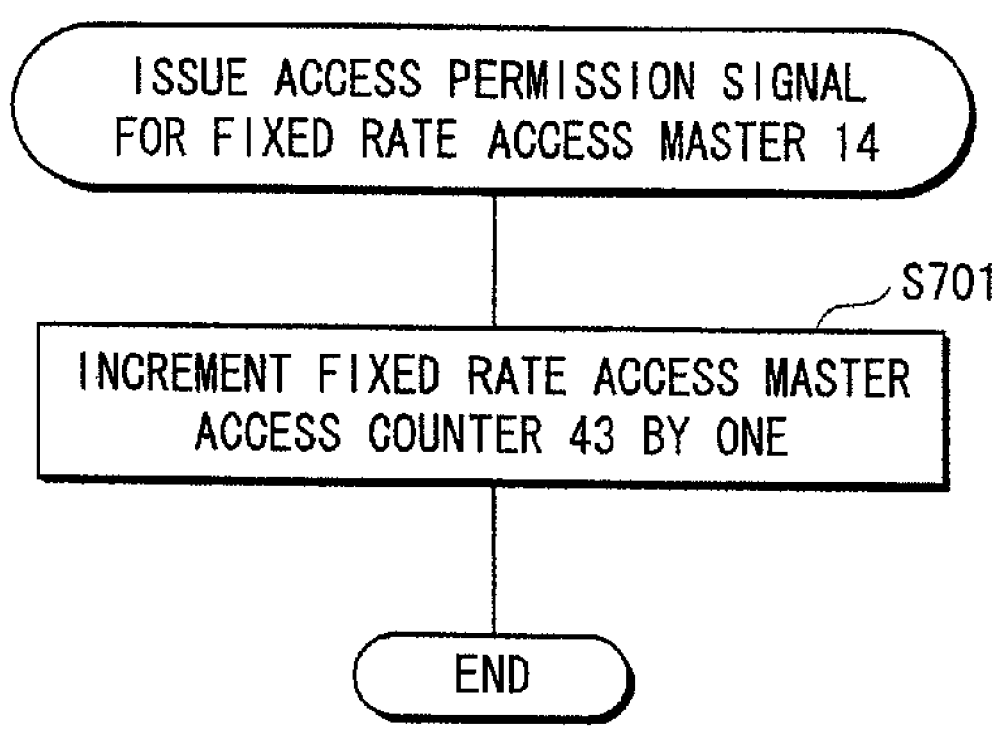
FIG. 7 is a flowchart that shows a counter control performed when an access permission signal for a fixed rate access master 14 has been issued.

Next is a description of a counter control performed when the arbitration unit 18 has issued an access permission signal for the fixed rate access master 14, with reference to the flowchart in FIG. 7.

When an access permission signal for the fixed rate access master 14 is issued, the fixed rate access master access counter 43 is incremented by one (Step S701), and then processing is ended.

Figure 8:
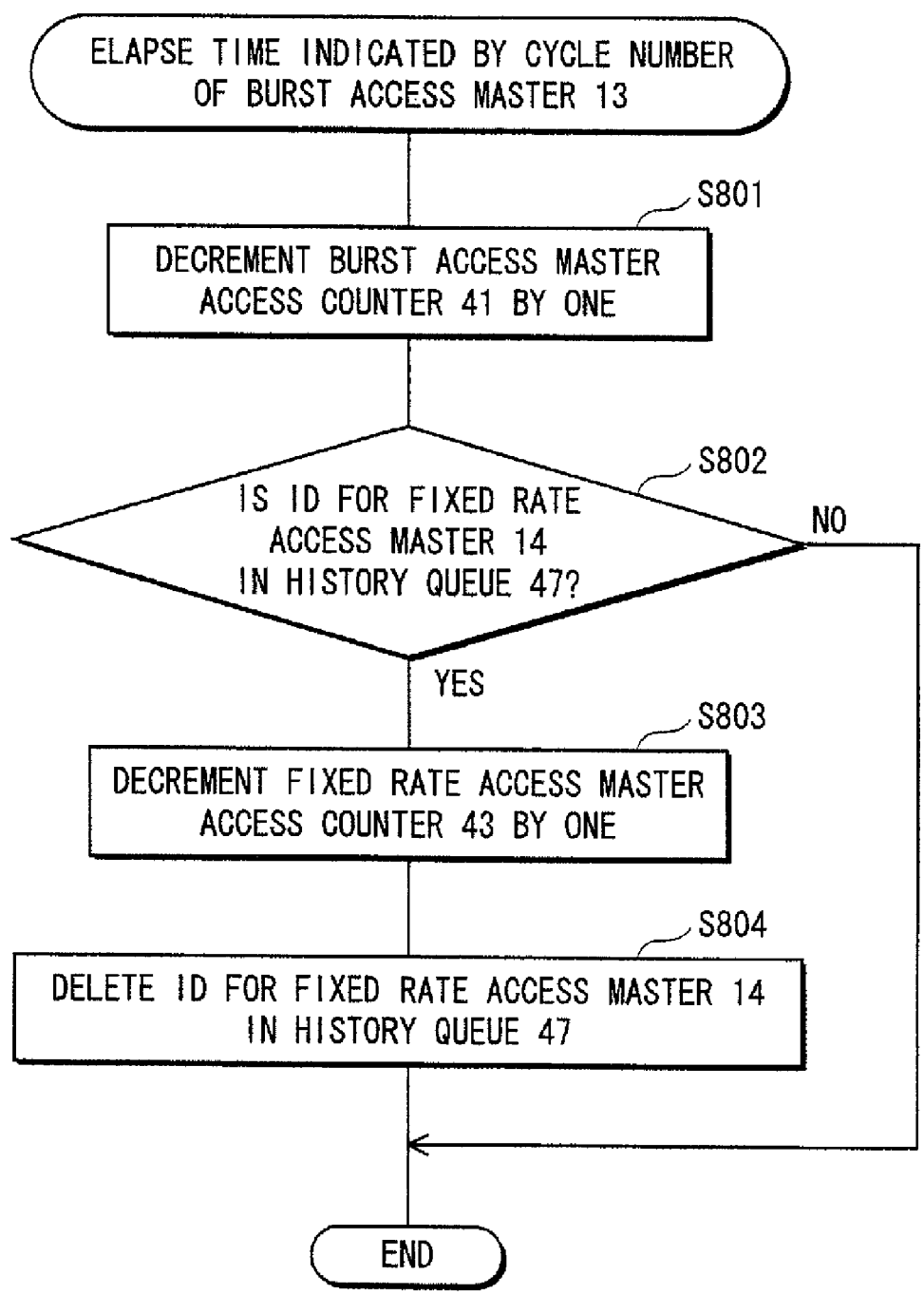
FIG. 8 is a flowchart that shows a counter control performed when a period indicated by the cycle number of the burst access master 13 has elapsed.

Next is a description of a counter control performed when the period indicated by the cycle number of the burst access master 13 has elapsed, with reference to the flowchart in FIG. 8.

When the period indicated by the cycle number of the burst access master 13 has elapsed, the burst access master access counter 41 is decremented by one (Step S801). Next, a determination is made of whether or not the ID of the fixed rate access master is in the history queue 47 (Step S802). If the ID of the fixed rate access master 14 is in the history queue 47, the fixed rate access master access counter 43 is decremented by one (Step S803), and the ID of the fixed rate access master 14 in the history queue 47 is deleted (Step S804). If the ID of the fixed rate access master is not in the history queue 47, processing is ended.

Figure 9:
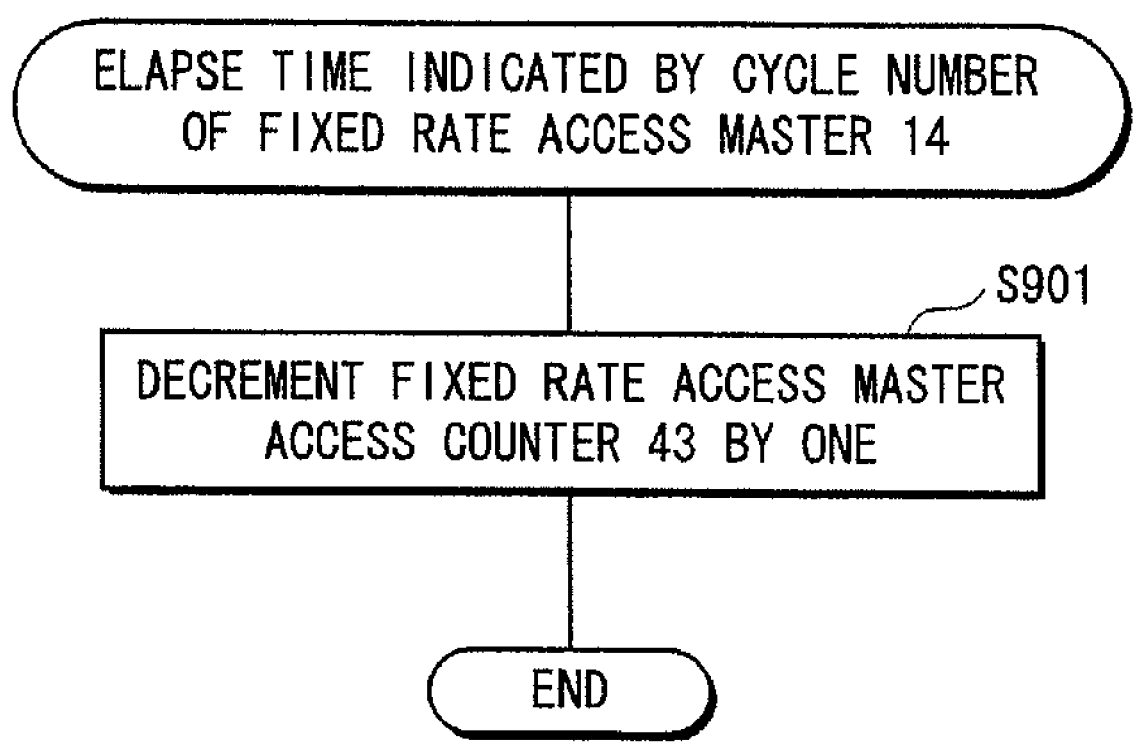
FIG. 9 is a flowchart that shows a counter control performed when a period indicated by the cycle number of the fixed rate access master 14 has elapsed.

Next is a description of a counter control performed when the period indicated by the cycle number of the fixed rate access master 14 has elapsed, with reference to the flowchart in FIG. 9.

When the period indicated by the cycle number of the fixed rate access master 14 has elapsed, the fixed rate access master access counter 43 is decremented by one (Step S901), and then processing is ended.

It should be noted here that the number of accesses to be guaranteed in the period indicated by the cycle number of the burst access master 13 and the fixed rate access master 14 is, in both cases, one.

Next is a description of the specific operation, with reference to FIG. 10. In FIG. 10, the transitions of a master C counter and a master D counter are shown expressed in a time series. Here, the master C indicates the burst access master 13, and a master C command is a command that is issued when the master C accesses the shared memory. The master D indicates the fixed rate access master 14, and a master D command is a command that is issued when the master D accesses the shared memory. The first tier indicates transitions of the count value of the master C. The vertical axis is the count value of the master C counter, and the horizontal axis is time. The second tier indicates transitions of the state of the access right control unit 34. The third tier indicates the history queue. The fourth tier indicates transitions of the count value of the master D. The vertical axis is the count value of the master D counter, and the horizontal axis is time. The cycle number of the master C is 307 clk, and the number of accesses to be guaranteed in the period indicated by the cycle number is one. The cycle number of the master D is 949 clk, and the number of accesses to be guaranteed in the period indicated by the cycle number is three. That is, in the level 1 interval, it is possible for the master C to exceed one instance of access, which is its own permitted number of accesses, and access the memory until the count value reaches a maximum of four.

First, at $T_1$, the master C command is issued. The count value of the master C counter is 0 at time $T_1$, and so the master C counter is incremented by one. At $T_2$, the period indicated by the cycle number of the master C has elapsed, so the master C counter is decremented by one, and the count value becomes zero. Next, at $T_3$, the master C command is issued again, and the count value of the master C counter is zero, so the master C counter is incremented by one. Next, at $T_4$, the command is issued again. However, the count value of the master C is already one. Thus, an access right is borrowed from the master D, and access at a rate greater than the rate of the master C is started. The master C counter is incremented by one, and the master D counter is also incremented by one. Then, an ID that indicates the master D is stored in the history queue. Here, time $T_4$ is the start time for level 1. At $T_5$ and $T_6$, the master C command is issued. Thus, the master C counter is likewise incremented by one at $T_5$ and $T_6$, and the master D counter is also incremented by one at $T_5$ and $T_6$. Then, an ID that indicates the master D is stored in the history queue. At $T_7$, the period indicated by the cycle number of the master C has elapsed, so the master C counter is decremented by one, and the count value becomes three. Moreover, the access right that was borrowed from the master D at time $T_4$ is returned. Thus, the master D counter is also decremented by one, and the count value becomes two. The master C command is issued again at time $T_8$. Because this is still in the level 1 interval, an access right is borrowed from the master D. That is, the master C counter is incremented by one, and the master D counter is also incremented by one. Then, an ID that indicates the master D is stored in the history queue. The period of level 1 ends at time $T_9$. Thus, subsequent to time $T_9$, the master C cannot access the memory until the count value of the master C counter becomes zero. That is, the interval of level 2 begins at $T_9$. At $T_{10}$, the period indicated by the cycle number of the master C has elapsed, and so the count value of the master C counter is decremented by one, and becomes three. On the other hand, the count value of the master D counter is returned from the master C and decremented by one, and in addition, the period indicated by the cycle number of the master D has elapsed, so the count value of the master D counter is further decremented by three, and the count value becomes −1. At $T_{11}$, $T_{12}$, and $T_{13}$, the master D command is issued, and the count value of the master D counter is incremented by one at each of $T_{11}$, $T_{12}$, and $T_{13}$. At $T_{14}$, the period indicated by the cycle number of the master C has elapsed, so the count value of the master C counter is decremented by one, and becomes two. On the other hand, the count value of the master D counter is likewise decremented by one, so the count value of the master D counter becomes one. At $T_{15}$ and $T_{16}$, the master D command D is issued, and the count value of the master D counter is incremented by one at each of $T_{15}$, and $T_{16}$. At $T_{17}$, the period indicated by the cycle number of the master C has elapsed, so the count value of the master C counter is decremented by one and becomes one. On the other hand, the count value of the master D counter is likewise decremented by one, so the count value of the master D counter becomes two. Here, all of the access rights borrowed from the master D in the interval that the master C was at level 1, as shown in the history queue, are returned. That is, at this time the period of level 2 ends. Next is the interval of level 3. At $T_{18}$, the master D command is issued, and the count value of the master D counter is incremented by one. At $T_{19}$, the period indicated by the cycle number of the master C has elapsed, so the count value of the master C counter is decremented by one and becomes zero. On the other hand, the period indicated by the cycle number of the master D has elapsed, so the count value of the master D counter is decremented by three and becomes zero.

As described above, when a specific period (the period of level 1) ends, access by the master C is prohibited until the access counter of the master C becomes zero, and during that interval the master C returns the bandwidth it was using in the specific period to the master D. Thus, total bandwidth is guaranteed for the master D in the access guaranteed period. Also, access right borrowing control is started from the point at which the master C has performed access exceeding its own bandwidth rate.

Next is a description of a procedure for producing mask signals in each state of the access right control unit 34.

The access right control unit 34, in the default state, is in the level 0 state described above. In this state, for the mask signal, Low is always output to the request masking unit 32 of the burst master 13. On the other hand, the mask signal output to the request masking unit 36 of the fixed rate access master 14 is as follows. Compared and assessed are: transfer size information or the number of access instances from the fixed rate access master 14; the permitted access frequency of the fixed rate access master 14, which is one of the parameter signals output from the parameter holding unit 35; and the value of the access counter 43 for the fixed rate access master 14. When the sum of the transfer size information or the number of access instances plus the value of the access counter 43 for the fixed rate access master 14 exceeds the permitted access frequency, High is output. When that sum does not exceed the permitted access frequency, Low is output.

Here, when the output mask signal is Low, the access request signal is not masked. When the output mask signal is High, the access request signal is masked.

In the state of level 1, for the mask signal output to the request masking unit 36 of the fixed rate access master 14, High is always output. On the other hand, the mask signal output to the request masking unit 32 of the burst access master 13 is as follows. Compared and assessed are: transfer size information or the number of access instances from the burst access master 13; the sum total of the permitted access frequency of the burst access master 13, which is the parameter signal output from the parameter holding unit 31, and the maximum number of times an access right can be borrowed or the maximum borrow size, which is one of the borrowing parameter signals output from the borrowing parameter holding unit 33; and the value of the access counter 41 of the burst access master 13. When the sum of the transfer size information or number of access instances and the value of the access counter 41 of the burst access master 13 exceeds the sum total above, High is output. When it does not exceed the sum total above, Low is output.

In the state of level 2, for the mask signal output to the request masking unit 32 of the burst access master 13, High is always output. On the other hand, the mask signal output to the request masking unit 36 of the fixed rate access master 14 is as follows. Compared and assessed are: the transfer size information or the number of access instances from the fixed rate access master 14, the permitted access frequency of the fixed rate access master 14, which is one of the parameter signals output from the parameter holding unit 35, and the value of the access counter 43 for the fixed rate access master 14. When the sum of the transfer size information or the number of access instances and the value of the access counter 43 for the fixed rate access master 14 exceeds the permitted access frequency, High is output. When that sum does not exceed the permitted access frequency, Low is output.

In the state of level 3, the mask signal output to the request masking unit 32 of the burst access master 13 is as follows. Compared and assessed are: the transfer size information or the number of access instances from the burst access master 13, the permitted access frequency of the burst access master 13, which is the parameter signal output from the parameter holding unit 31, and the value of the access counter 41 for the burst access master 13. When the sum of the transfer size information or the number of access instances and the value of the access counter 41 for the burst access master 13 exceeds the permitted access frequency, High is output. When that sum does not exceed the permitted access frequency, Low is output. On the other hand, the mask signal output to the request masking unit 36 of the fixed rate access master 14 is as follows. Compared and assessed are: the transfer size information or the number of access instances from the fixed rate access master 14, the permitted access frequency of the fixed rate access master 14, which is one of the parameter signals output from the parameter holding unit 35, and the value of the access counter 43 for the fixed rate access master 14. When the sum of the transfer size information or the number of access instances and the value of the access counter 43 for the fixed rate access master 14 exceeds the permitted access frequency, High is output. When that sum does not exceed the permitted access frequency, Low is output.

According to the present embodiment as described above, in a system in which the burst access master 13, such as a CPU that performs peak access beyond an average bandwidth that occurs locally, and the fixed rate access master 14 share the same memory, it is possible to guarantee a peak access function for a burst access master with memory that guarantees an average total bandwidth.

Second Embodiment

In the first embodiment, the fixed rate access master 14 was always masked when the access right control unit 34 of the central request restriction unit 17 was in the state of level 1. In the present embodiment, even when the access right control unit 34 of the central request restriction unit 17 according to the first embodiment is in the state of level 1, access by the fixed rate access master 14 is permitted at a specific frequency.

Therefore, in the present embodiment, the borrowing parameter holding unit 33 also holds minimum guaranteed access frequency information for the fixed rate access master 14. With the access right control unit 34 in the state of level 1, the mask signal output to the request masking unit 36 of the fixed rate access master 14 is as follows. Compared and assessed are: the transfer size information or the number of access instances from the fixed rate access master 14, the minimum guaranteed access frequency of the fixed rate access master 14, which is one of the parameter signals output from the borrowing parameter holding unit 33, and the value of the access counter 43 for the fixed rate access master 14. When the sum of the transfer size information or the number of access instances and the value of the access counter 43 for the fixed rate access master 14 exceeds the minimum guaranteed access frequency, High is output. When that sum does not exceed the permitted access frequency, Low is output.

According to the present embodiment as described above, it is possible to guarantee peak access by the burst access master 13 without stopping access by the fixed rate access master 14.

Third Embodiment

In the first embodiment, the central request restriction unit 17 was connected to one burst access master 13 and one fixed rate access master 14. In the present embodiment, the central request restriction unit 17 is connected to one burst access master 13 and a plurality of fixed rate access masters 14, and access request signals and the number of access instances or transfer size information are received from each.

In the present embodiment, in the access right control unit 34, access right control for the burst access master 13 can be realized with any of the three controls below.

First, a control is performed that borrows an access right from the master whose access frequency is the lowest in the access counter corresponding to each fixed rate access master, at the time that the burst access master 13 requires borrowing of an access right.

Second, a control is performed that borrows an access right from a master for which the value of the access counter corresponding to each fixed rate access master drops below a borrowing permission maximum access frequency that has been set in advance, at the time that the burst access master 13 requires borrowing of an access right. Here, the borrowing parameter holding unit 33 holds the borrowing permission maximum access frequency that has been set in advance. Thus, desired settings are possible.

Third, the period in which the burst access master 13 borrows an access right (the period in which the state of the access right control unit 34 is level 1) is divided into a plurality of intervals in advance, and the fixed rate access master allowed to borrow an access right is prescribed for each of the divided intervals. At the time that the burst access master 13 requires borrowing of an access right, a control is performed that borrows an access right from the fixed rate access master allocated to the interval that includes that time. Here, the borrowing parameter holding unit 33 holds the dividing parameters of the plurality of intervals, and allocation information of the fixed rate access master for each interval. Thus, desired settings are possible.

According to the present embodiment as described above, even in the case that it is not possible to realize guaranteed peak access for the burst access master 13 by only borrowing an access right from a single fixed rate access master, it is possible to realize guaranteed peak access for the burst access master 13 by borrowing an access right from a plurality of fixed rate access masters.

Also, in the present embodiment, an example configuration was described in which the central request restriction unit 17 was connected to one burst access master and a plurality of fixed rate access masters, but a configuration may also be adopted in which the central request restriction unit 17 is connected to both a plurality of burst access masters and a plurality of fixed rate access masters.

Also, it is preferable from the viewpoint of ease of setting the borrowing parameters to select, as the masters that are connected to the central request restriction unit 17, masters that have a similar cycle number, which is the standard for master performance requirements, or masters that have cycle numbers of a fixed multiple.

(Supplement)

Above, the arbitration device according to the present invention was described based on embodiments, but of course the present invention is not limited to the embodiments above.

In the above embodiments, for ease of circuit implementation an arbiter with a fixed priority order was used for the arbitration unit 18, but an arbiter with which it is possible to dynamically change the priority order, such as in a conventional round-robin system, may also be used.

In the above embodiments, the level 3 period was provided after level 2, but as shown by the dotted line in FIG. 5, the access right control unit 34 may perform control that moves from level 2 to level 0 with condition 3, without having the state of level 3.

The above embodiments had configurations in which the parameter holding unit 21, the parameter holding unit 31, the parameter holding unit 35, and the borrowing parameter holding unit 33 were each present individually, but a configuration may also be adopted in which a unit of these is managed with a single parameter holding unit, and a configuration may also be adopted in which all of these are managed with a single parameter holding unit.

The above embodiments had configurations in which the parameter holding unit 21, the parameter holding unit 31, the parameter holding unit 35, and the borrowing parameter holding unit 33 are present within the request restriction unit 15 and the central request restriction unit 17, but a configuration may also be adopted in which these are present outside of the request restriction unit 15 and the central request restriction unit 17.

In the above embodiments, a description was given in which the burst access master 13 was a control unit such as a CPU that sometimes performs access in a burst-like manner, and sometimes does not perform access at all for some duration, and the fixed rate access master 14 was a control unit whose accesses need to be guaranteed to a certain degree during an access guarantee period. However, a configuration may also be adopted in which the burst access master 13 and the fixed rate access master 14, respectively, are a control unit with a short access guarantee period and a control unit with a long access guarantee period, or in which they respectively are a control unit that emphasizes quick response and a control unit that emphasizes rate guarantee, or in which they respectively are a control unit with unpredictable access and a control unit with predictable access.

In the above flowcharts, the number of accesses to be guaranteed in the period indicated by the cycle number of the burst access master 13 and the fixed rate access master 14 is one for both the burst access master 13 and the fixed rate access master 14, but the number of accesses may also be a plurality for each. In this case, in S602 in FIG. 6, a determination is made of whether or not the burst access master access counter 41 is not less than a value obtained by adding one to the number of accesses to be guaranteed in the period indicated by the cycle number of the burst access master 13. In S803 in FIG. 8, the number of accesses to be guaranteed in the period indicated by the cycle number of the burst access master 13 is compared to the number of borrowing instances, and the fixed rate access master access counter 43 is decremented by the lesser value. When both values are the same, the fixed rate access master access counter 43 is decremented by that value. In S801 in FIG. 8, the burst access master access counter 41 is decremented by the number of accesses to be guaranteed in the period indicated by the cycle number of the burst access master 13. Likewise, in S901 in FIG. 9, the fixed rate access master access counter 43 is decremented by the number of accesses to be guaranteed in the period indicated by the cycle number of the fixed rate access master 14.

In the above embodiments, a description was given with respect to memory access, but it is also applicable to other than memory access.

In the above embodiments, an arbitration device was used, but the present invention may also be a method including the steps indicated in the above flowcharts, and an integrated circuit such as a system LSI.

The arbitration device according to the present invention, in the manufacturing industry, can be economically, continuously, and repeatedly manufactured and sold. Also, in a system including a master in which burst access is present, the arbitration device according to the present invention guarantees access performance at peak times with low bandwidth, and is useful as a memory arbitration circuit or the like of a system LSI that adopts a unified memory architecture configuration. It is also applicable in applications such as an access arbitration circuit for built-in DRAM or internal SRAM.

The invention claimed is:

1. An arbitration device that arbitrates among a plurality of master devices, such that each master device is allowed to access a shared memory, the arbitration device comprising:

a receiving unit operable to receive an access request requesting to access the shared memory, the access request being received from a specific master device; and an access control unit operable to permit an access request in a predetermined first period, if the access request received by the receiving unit from the specific master device is beyond a bandwidth that has been allocated to the specific master device in advance, operable to mask an access request from the specific master device in a second period that follows the predetermined first period, and operable to mask, in a third period that follows the second period, an access request from the specific master device that is beyond the bandwidth that has been allocated in advance.

2. An arbitrating method of arbitrating among a plurality of master devices, such that each master device is allowed to access a shared memory, the arbitrating method comprising:

receiving an access request requesting to access the shared memory, the access request being received from a specific master device;

permitting an access request in a predetermined first period, if the received access request is beyond a bandwidth that has been allocated to the specific master device in advance;

masking an access request from the specific master device in a second period that follows the predetermined first period; and masking, in a third period that follows the second period, an access request from the specific master device that is beyond the bandwidth that has been allocated in advance.

3. A video processing device comprising a plurality of master devices and an arbitration device that arbitrates among the master devices such that each master device is allowed to access a shared memory, wherein the arbitration device comprises:

a receiving unit operable to receive an access request requesting to access the shared memory, the access request being received from a specific master device; and an access control unit operable to permit an access request in a predetermined first period, if the access request received by the receiving unit from the specific master device is beyond a bandwidth that has been allocated to the specific master device in advance, operable to mask an access request from the specific master device in a second period that follows the predetermined first period, and operable to mask, in a third period that follows the second period, an access request from the specific master device that is beyond the bandwidth that has been allocated in advance, wherein the specific master device is a supply unit that supplies data to a CPU in the video processing device, wherein a master device other than the specific master device is a supply unit that supplies data to a decoder unit in the video processing device, and wherein the predetermined first period, the second period, and the third period are prescribed within one processing cycle of an A V signal.

4. An integrated circuit that arbitrates among a plurality of master devices, such that each master device is allowed to access a shared memory, the integrated circuit comprising:

a receiving unit operable to receive an access request requesting to access the shared memory, the access request being received from a specific master device; and an access control unit operable to permit an access request in a predetermined first period, if the access request received by the receiving unit from the specific master device is beyond a bandwidth that has been allocated to the specific master device in advance, operable to mask an access request from the specific master device in a second period that follows the predetermined first period, and operable to mask, in a third period that follows the second period, an access request from the specific master device that is beyond the bandwidth that has been allocated in advance.

* * * * *

UNITED STATES PATENT AND TRADEMARK OFFICE
CERTIFICATE OF CORRECTION

PATENT NO. : 7,779,190 B2  Page 1 of 1
APPLICATION NO. : 12/559916
DATED : August 17, 2010
INVENTOR(S) : Tetsuji Mochida et al.

It is certified that error appears in the above-identified patent and that said Letters Patent is hereby corrected as shown below:

Title Page

In Section (30) Foreign Application Priority Data, please insert the following:

--Jun. 24, 2004     (JP)  ............2004-186073--

Signed and Sealed this

Ninth Day of November, 2010

David J. Kappos
*Director of the United States Patent and Trademark Office*